US009659395B2

(12) United States Patent
Bernstein et al.

(10) Patent No.: US 9,659,395 B2
(45) Date of Patent: May 23, 2017

(54) SYSTEMS, METHODS, AND COMPUTER-READABLE MEDIA FOR GENERATING AND DISPLAYING VISUAL IMAGES

(71) Applicants: Jay M. Bernstein, Deer Park, NY (US); Michelle Bernstein, Deer Park, NY (US); Joseph A. Urraro, Islip, NY (US); Elliot Klugman, Great Neck, NY (US)

(72) Inventors: Jay M. Bernstein, Deer Park, NY (US); Michelle Bernstein, Deer Park, NY (US); Joseph A. Urraro, Islip, NY (US); Elliot Klugman, Great Neck, NY (US)

(73) Assignee: WIN-WIN SOLUTIONS GROUP, INC., Bay Shore, NY (US)

( * ) Notice: Subject to any disclaimer, the term of this patent is extended or adjusted under 35 U.S.C. 154(b) by 0 days.

(21) Appl. No.: 14/750,473

(22) Filed: Jun. 25, 2015

(65) Prior Publication Data
US 2015/0379742 A1  Dec. 31, 2015

Related U.S. Application Data

(60) Provisional application No. 62/017,064, filed on Jun. 25, 2014.

(51) Int. Cl.
G06T 11/00 (2006.01)
G06T 11/60 (2006.01)
G06F 3/048 (2013.01)

(52) U.S. Cl.
CPC .............. *G06T 11/60* (2013.01); *G06F 3/048* (2013.01)

(58) Field of Classification Search
CPC combination set(s) only.
See application file for complete search history.

(56) References Cited

U.S. PATENT DOCUMENTS

| 2008/0255977 | A1* | 10/2008 | Altberg | G06F 17/30979 705/35 |
| 2009/0080635 | A1* | 3/2009 | Altberg | G06Q 30/02 379/216.01 |

(Continued)

Primary Examiner — Wesner Sajous
(74) Attorney, Agent, or Firm — Carter, DeLuca, Farrell & Schmidt, LLP

(57) ABSTRACT

System, methods, and computer-readable media are provided that include receiving an input including data items for creating an account for a member on a website, where the data items include category and/or attribute selections, determining whether one or more category selections have been received, designating an image corresponding thereto, if the one or more category selections have been received, assigning an outer portion shape, based on a number of received category selections, determining whether attribute selections have been received, associating a visual indicator with each attribute selection, designating segments of the outer portion shape with the visual indicators associated with each of the attribute selections, generating an icon, based on the designated image and the assigned outer portion shape, wherein the one or more segments of the outer portion shape are designated visual indicators associated with each of the attribute selections, and displaying the icon.

20 Claims, 8 Drawing Sheets

(56) References Cited

U.S. PATENT DOCUMENTS

| | | | |
|---|---|---|---|
| 2013/0073400 A1* | 3/2013 | Heath | G06Q 30/02 |
| | | | 705/14.73 |
| 2013/0191195 A1* | 7/2013 | Carlson | G06Q 30/0224 |
| | | | 705/14.17 |
| 2015/0081440 A1* | 3/2015 | Blemaster | G06Q 30/0256 |
| | | | 705/14.54 |
| 2016/0203497 A1* | 7/2016 | Tietzen | G06Q 30/0226 |
| | | | 705/14.27 |

* cited by examiner

Wondering what the colored circles mean?

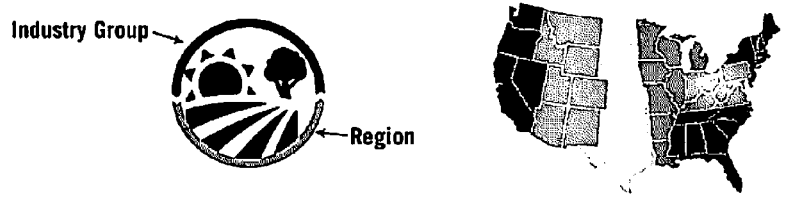

| | Industry Group | | Region |
|---|---|---|---|
| 412a | Agriculture, Transportation, Moving & Storage | 414a | Western Region: Alaska, Hawaii, Nevada, California, Oregon, Washington |
| 412b | Construction, Manufacturing, Energy or Defense | 414b | Mountain Region: Arizona, Utah, Idaho, Montana, Wyoming, Colorado, New Mexico |
| 412c | Entertainment, Travel, Food and Beverage | 414c | Plains Region: North Dakota, South Dakota, Nebraska, Kansas, Oklahoma, Texas |
| 412d | Finance, Technology, Communication, Professional Services | 414d | Central Region: Minnesota, Iowa, Missouri, Arkansas, Michigan, Louisiana, Illinois, Wisconsin |
| 412e | Education, Health Care, Non-profit and Government | 414e | Northeast Region: Maine, New Hampshire, Vermont, Massachusetts, New York, Connecticut, Rhode Island, New Jersey |
| 412f | Retail, Wholesale | 414f | Southeast Region: North Carolina, South Carolina, Georgia, Florida, Alabama, Tennessee, Mississippi |
| 412g | Property Management, Real Estate | 414g | Mid-Atlantic Region: Pennsylvania, Ohio, Delaware, Maryland, DC, West Virginia, Virginia, Kentucky, Indiana |

Industry Icons

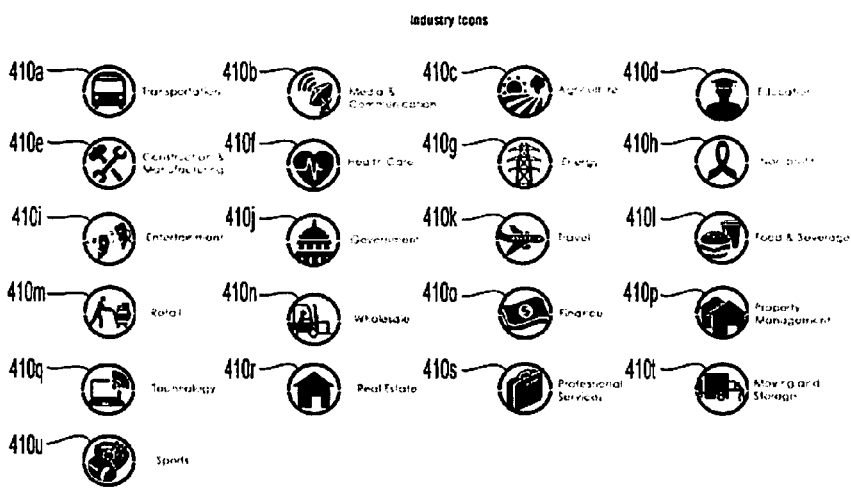

*Fig. 4*

SYSTEMS, METHODS, AND COMPUTER-READABLE MEDIA FOR GENERATING AND DISPLAYING VISUAL IMAGES

CROSS-REFERENCE TO RELATED APPLICATIONS

This application claims the benefit of provisional application Ser. No. 62/017,064, entitled "Methods to Achieve Unique Multi-attribute Combinatorial Visual Image Creation for an Element of a Set" filed on Jun. 25, 2014.

BACKGROUND

Social networks are becoming increasingly popular to not only connect people to people, but also to allow businesses to connect with other businesses. Businesses can access social networks to thereby use social media to disseminate real-time marketing-based information, such as product launches, reviews, promotions, and the like. As businesses are more connected than ever to social media, Internet-based media and marketing is crucial to keeping up with competitors.

As is typically the case, social networks are built on website platforms that may require users to be a member to access a website network. In this regard, each member provides identifying information during registration. After completion of registration, membership is activated and the member can access different pages on the website. For example, the member can post content to various pages for other members to view and/or access pages of other members for viewing. In many cases, the membership also includes the ability to connect with others and to open dialogue within a trusted site.

SUMMARY

Although connections are an important feature of social networks, finding the members having characteristics of interest can be challenging. Specifically, unless a member is already aware of the existence of another member, finding a new member to connect with may involve extensive searching and/or sorting of member pages. Additionally, locating information identifying the member characteristic may require viewing the member page in its entirety. As many networking sites may have thousands of members, viewing each member page may be time-consuming.

To improve the online networking experience, features are now provided to more easily and efficiently create business relationship connections. In an embodiment, a method is provided that includes receiving an input including a plurality of data items for creating an account for a member on a website, where the plurality of data items includes one or more of a category selection and an attribute selection. The method also includes determining whether one or more category selections have been received, and designating an image corresponding to the category selection, if the one or more category selections have been received. Additionally, the method includes assigning an outer portion shape, based on a number of category selections that have been received. The method also includes determining whether one or more attribute selections have been received, associating a first type of visual indicator with each of the attribute selections, and designating one or more segments of the outer portion shape with the first type of visual indicators associated with each of the attribute selections. An icon is then generated, based on the designated image and the assigned outer portion shape, wherein the one or more segments of the outer portion shape are designated with the second type of visual indicators associated with each of the attribute selections, and the icon is displayed on a display.

Systems and non-transitory computer readable media are provided in accordance with other embodiments.

BRIEF DESCRIPTION OF THE DRAWINGS

Various aspects of the present disclosure are described hereinbelow with reference to the drawings, which are incorporated in and constitute a part of this specification, wherein:

FIG. 4 is a screenshot of a generated webpage, according to another embodiment;

DETAILED DESCRIPTION

Figure 1:
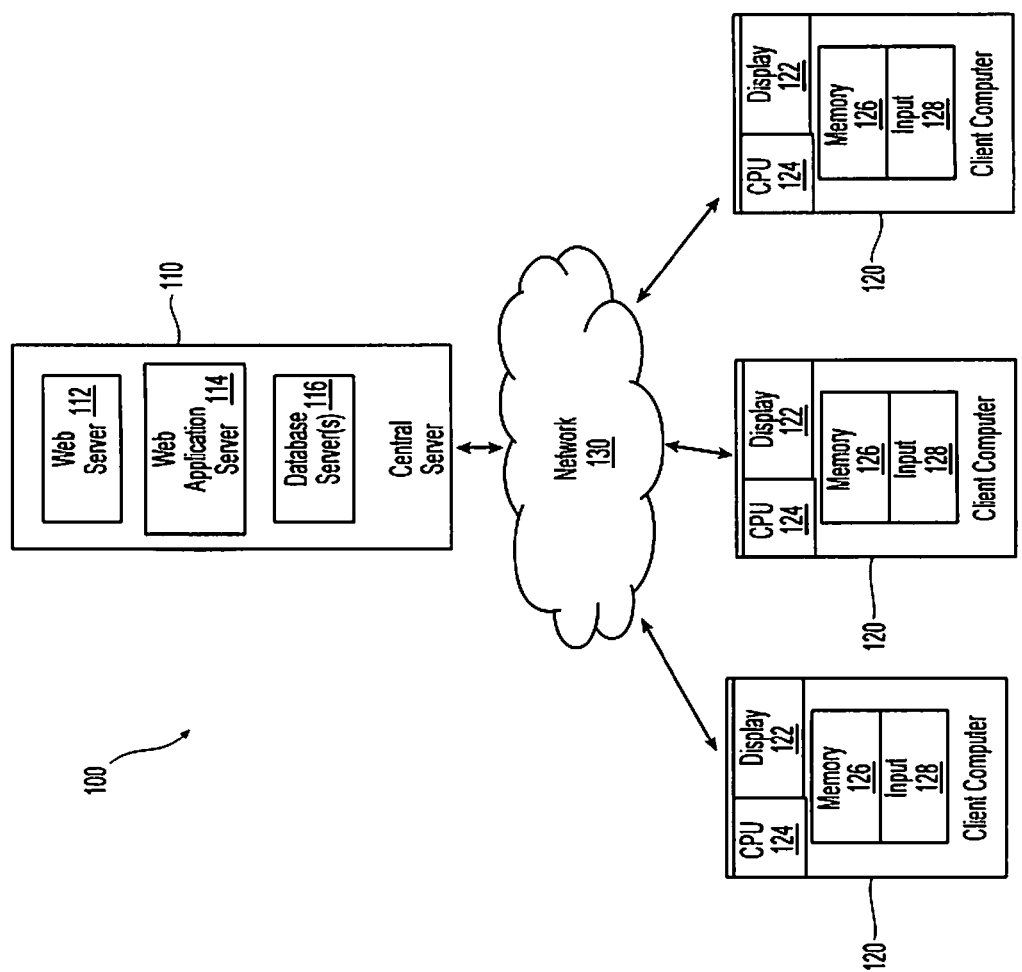
FIG. 1 is a simplified schematic of a network system, according to an embodiment.

Systems and methods are provided that improve relationship-building between members of a networking website by allowing network members to readily identify commonalities between each other. In an embodiment, the system receives and stores identifying information for each member, and the identifying information is used to generate an icon. The icon includes a central portion that may or may not include a unique image, where the unique image, if included, corresponds to a category. The icon also includes an outer portion which, depending on the particular identifying information, has one of a plurality of different shapes. According to an embodiment, the line segment(s) forming the shape of the outer portion are assigned one or more colors that correspond to an attribute from the stored identifying information. The generated icon is displayed on a member webpage and/or other webpage of the networking site. Thus, when a user views the icon, the user can quickly and easily recognize identifying information associated with the member. Embodiments of the present disclosure are now described in detail with reference to the drawings in which like reference numerals designate identical or corresponding elements in each of the several views.

Referring to FIG. 1, a simplified schematic of a network system 100 is provided. The network system 100 includes a central server 110, one or more client computers 120, and a network 130. The central server 110 provides services to and communicates with the client computers 120 via the network 130 and is configured to securely run applications and store data received from the client computers 120.

According to an embodiment, the central server 110 includes a web server 112, a web application server 114, and one or more database servers 116. The web server 112 provides content to the client computers 120 from the web application server 114 and provides data received as input from a user to the web application server 114. The web application server 114 runs instructions and logic that operate to provide a dynamic business networking platform, which are stored in the one or more database servers 116. The web application server 114 also responds to user input from the client computers 120 and dynamically incorporates the user input into content it provides to the web server 112.

The one or more client computers 120 are configured to provide a user interface, such as a browser, for the user to provide input and receive output from the central server 110. In an embodiment, the client computers 120 include a display 122 for outputting and displaying data, a processing device 124, a memory 126, and an input component 128.

The network 130 is a wired or wireless network, such as a local area network (LAN), a wide area network (WAN), a wireless LAN, the Internet, an intranet, a cloud communication network, or another type of network.

Figure 2:
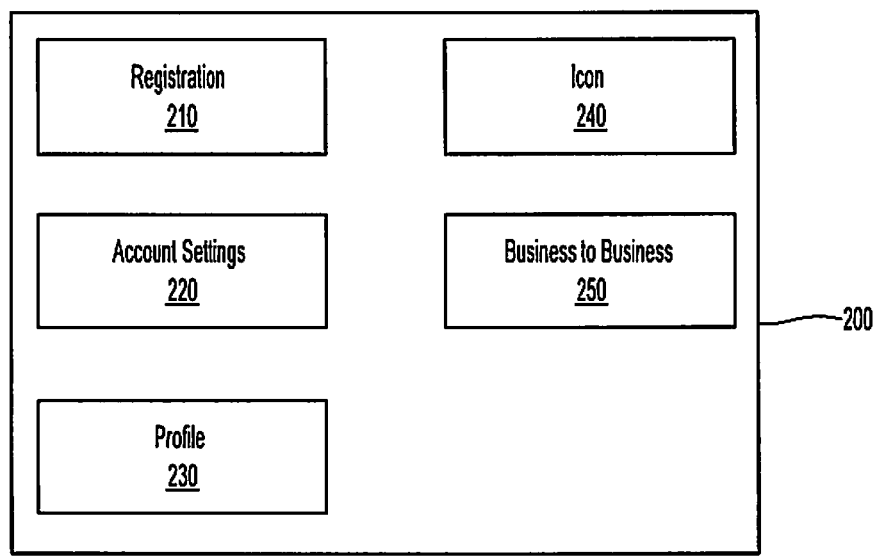
FIG. 2 is a simplified block diagram of a software architecture for use in the network environment of FIG. 1, according to an embodiment.

FIG. 2 is a simplified block diagram of a software architecture 200 for providing the business networking platform that may be stored in the one or more database servers, according to an embodiment. The software architecture 200 is configured to present content to a website, which can be provided to users at the client computers 120. The software architecture 200 includes a registration module 210, an account settings module 220, a profile module 230, an icon module 240, and a business-to-business (B2B) module 250. Although depicted as separate modules, two or more of the modules 210-250 interact to perform various functions in response to user input and may be combined as a single module, in another embodiment. In another embodiment, additional modules are included to provide other features. In another embodiment of the invention, a module incorporating geolocation and mapping visualization software can be combined with icon placement to examine proximity analysis which when combined with least path/least cost analysis software can determine routing alternatives between "related" entities.

The registration module 210 provides functionality operable to implement techniques for a new member to register on the website. The new member is a business, in an embodiment. In an embodiment, prior to providing access to the website, the registration module 210 provides instructions to display a sign-up page or pop-up for the user to provide a name or other identifying information, an email address, a user name or ID, and a user-generated or computer-generated password. The registration module 210 also provides instructions to display pages that include fillable text boxes for inputting business data, such as the business name, business address, location, logo, summary of the business, listing of products and/or services, business contact information, web addresses, industry identification, and the like. In an embodiment, the registration module 210 also includes options to add employees of the business, departments within the business, and/or different business locations, as separate new members. Additionally, the registration module 210 provides instructions to display one or more pages for the new member to select a membership level, which is differentiated by the number of available services and/or functionalities based on a membership fee amount.

The account settings module 220 provides functionality operable to implement processes to manage member accounts that are associated with the business at or after registration. For example, the account settings module 220 is configured to provide instructions to generate and display one or more fillable and/or editable pages including text boxes, pull-down menus, and/or buttons with which the user may interact to change or provide data that was previously provided during registration. The account settings module 220 also provides instructions to display one or more pages for managing member accounts, for example, activating or de-activating member privileges, adding additional members, and the like. In an embodiment, the account setting module 220 provides instructions to display one or more fillable and/or editable pages listing users and/or members that are associated with the membership, for example, in a table or other organized manner, and all of the selectable functionalities that are associated with the membership level. The displayed pages allow an account administrator to add or remove users and/or members associated with the membership and/or assign or change available functionalities to the users and/or members. The account setting modules 220 further provides functionality for online support.

The profile module 230 provides functionality to generate one or more profile pages based on the data provided via the registration module 210. In an embodiment, the profile module 230 generates the one or more profile pages from the business data, including but not limited to the business name, business address, location, logo, summary of the business, listing of products and/or services, business contact information, and web addresses, and displays the one or more profile pages. The one or more profile pages also include information pertinent to the business, including but not limited to a map to the business, images associated with the business, posts made by one of the account members associated with the member account, and a listing of account activities. The generated profile page further includes an icon that is used to allow other members of the social network to identify one or more attributes of the member.

Figure 3:
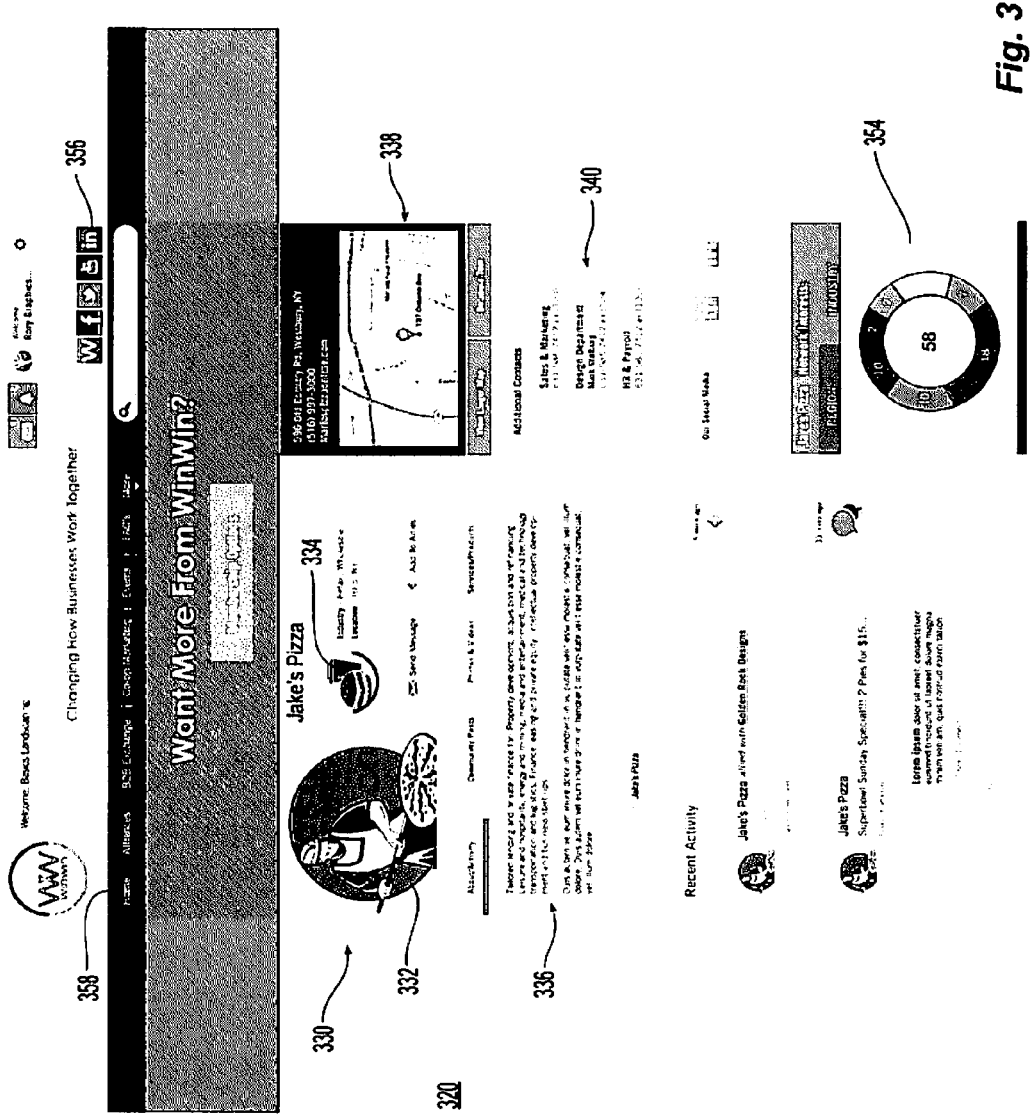
FIG. 3 is a screenshot of a generated webpage, according to an embodiment.

A screenshot 300 of a generated profile page 320 is provided in FIG. 3, in accordance with an embodiment. The generated profile page 320 includes a business identification section 330, which includes a logo 332, an icon 334, business description section 336, location information 338, and contacts 340. The generated profile page 320 also includes a recent activity log 342 listing postings, relationships, events, and other notable occurrences. A general section 350 includes advertisements 352 posted by other members, a network interest 354 section indicating the number of other members the business can connected with, and the like. Other portions of the generated profile page 320 include links 356 to social media websites and tabs 358 for website navigation.

The icon module 240 provides functionality to generate the icon. In an embodiment, the icon module 240 is thus configured to provide one or more pages including drop-down menus, fillable text boxes, selection buttons, and the like for a user to provide additional data that may be utilized in the creation of the icon. In this regard, the icon module 240 operates with the registration module 210 to provide such functionality during registration or with the account settings module 220 to provide such functionality during account setting to thereby allow the user to select one or more of the categories and/or attributes to associate with the business. In an embodiment, the icon module 240 utilizes a database, such as database server 116, to store image data and visual indicator data to be associated with particular category and attribute selections, as will be discussed in detail further below. In another embodiment, the database is stored in a different location.

The icon module 240 selects an image from the stored image data, based on the selected category. According to an embodiment, the icon module 240 also assigns a shape to surround the image, where the assigned shape has a number of sides that is equal to the number of attribute selections plus one. In accordance with another embodiment, the assigned shape surrounding the image is the same shape for every icon no matter the number of selected categories and/or attributes. The icon module 240 further associates visual indicator data to segments making up the shape, depending on the selected categories and attributes.

FIG. 4 is a screen shot of a webpage including images 410*a-u* that may be stored as the image data and visual indicators 412*a-g* and 414*a-g* that may be stored as the visual indicator data. The images 410*a-u* may be identifiable as related to the business networking platform and may be associated with various categories. In an embodiment, the categories are different business industries, and each image 410*a-u* represents a different business industry. The visual indicator 412*a-g* and 414*a-g* may be associated with industry groups (for example, related business industries that are grouped together) and regions, respectively. In other embodiments, other attributes are associated with the visual indicators. The visual indicators 412*a-g* and 414*a-g* provide visual cues that when viewed by a user can be distinguishable from each other. Examples of visual indicators include but are not limited to color indicators, line weight indicators, line dash indicators, shading, patterns, and the like. Here, the visual indicators 412*a-g* and 414*a-g* are different patterns. It will be appreciated that different visual indicators may be employed for the categories and the attributes, according to an embodiment. For example, different colors are used for the visual indicators associated with the categories, while different patterns are used for the visual indicators associated with the attributes. Other combinations are utilized in other embodiments.

The B2B module 250 provides functionality to connect members with other members. In this regard, the B2B module 250 operates with the registration module 210 to obtain data relating to other members and to display the data to the user. As such, the B2B module 250 generates and provides instructions to display one or more pages including certain content deemed by the member to be viewable to other members, generates pages for data exchange viewable by certain members which include posts and/or comments and/or data items provided by other members, and provide pages including fillable and/or editable text boxes, pull-down menus, selectable buttons, and the like for posting information to be shared with the other members. The B2B module 250 also provides a search feature that allows members to search for other members using various parameters, such as location, industry, and the like, and the attributes (such as those used for creating the icons by the icon module 240). The B2B module 250 generates a list of members matching the selected parameters. According to an embodiment, the B2B module 250 provides the list of members matching the selected parameters along with the icons previously generated for each of the listed members.

Figure 5:
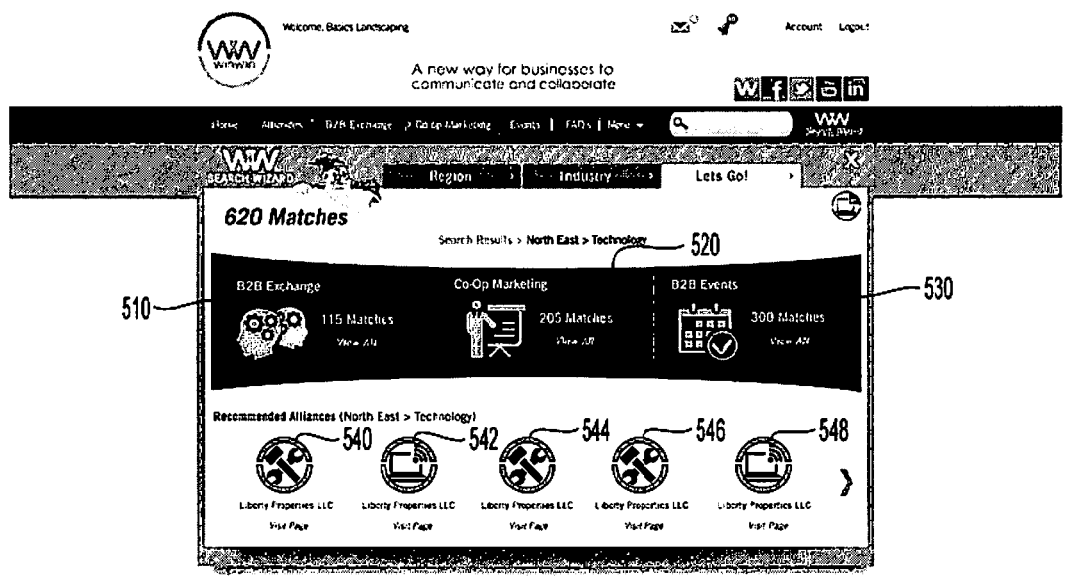
FIG. 5 is a screenshot of a generated webpage, according to still another embodiment.

FIG. 5 is a screenshot of a webpage generated by the B2B module 250 including the results of the matched selected parameters, in accordance with an embodiment. In an embodiment in which a user member selects members located in the northeast that are involved in technology, the webpage displays results including a section 510 for members matching the selected parameters, a section 520 for existing co-op marketing opportunities, and a section 530 for found posted events. The webpage also shows icons 540, 542, 544, 546, 548 of members recommended for alliances. As described in more detail below, the icons 540-548 can be viewed by the user and immediately recognized to assess whether those members can fulfill the identified need.

Figure 6:
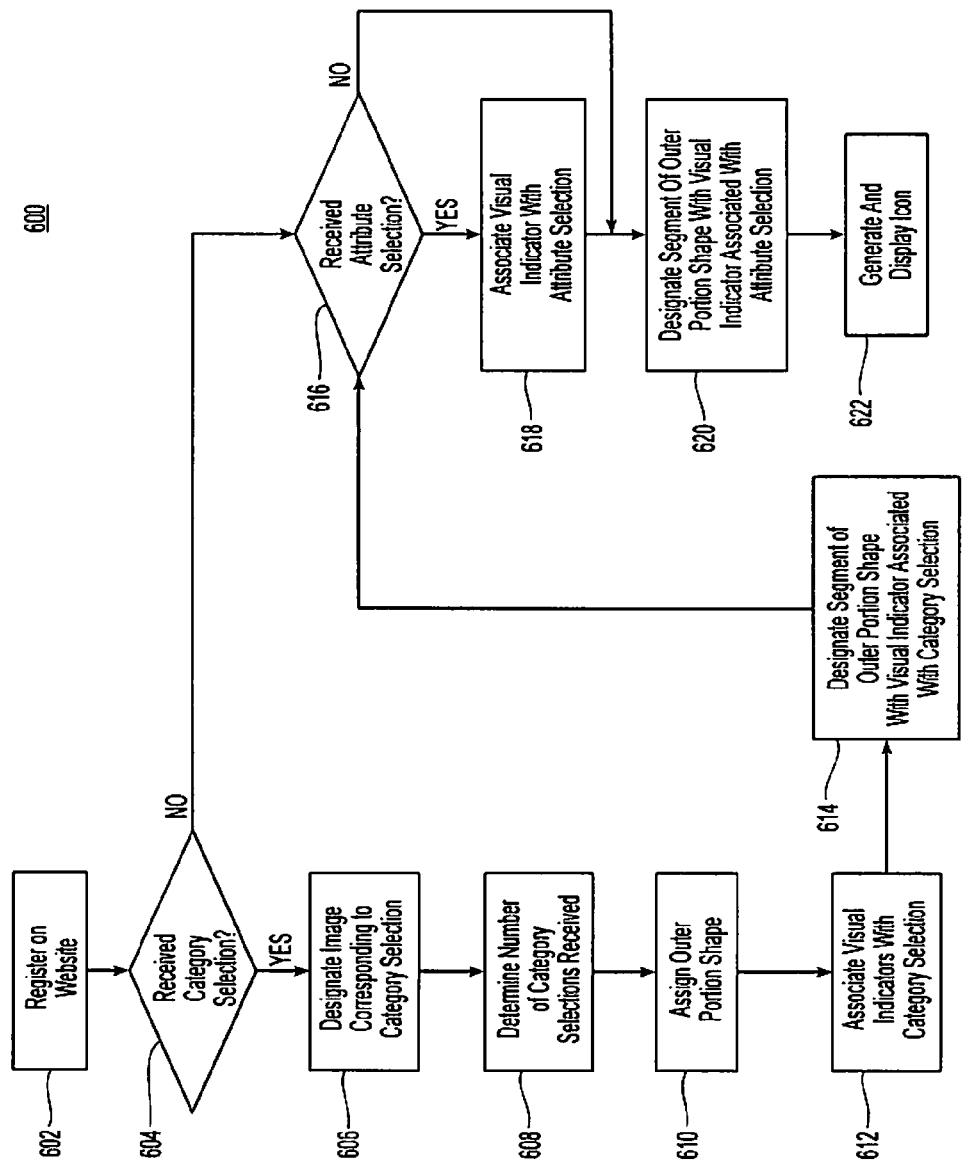
FIG. 6 is a flow diagram of a method of generating an icon, according to an embodiment.

FIG. 6 is a method 600 of generating the icon, according to an embodiment. To initiate method 600, a user begins registration as a member on the business networking website at step 602. For example, the user may access the business networking website and enter information associated with a business to thereby begin a process of registering the business as a new member of the website. In an embodiment, the registration module 210 generates and provides instructions to display one or more pages with which the user may interact. In particular, the pages allow the user to input data via selections made from a pull-down menu, clickable list, or the like to indicate an industry that the business is associated with and geographic region in which the business is located.

In response to the user input, a determination is made as to whether a category selection has been received at step 604. A category may be one of a number of different industries with which businesses may associate. For example, the category selection may be one or more of, but are not limited to Agriculture, Transportation, Moving & Storage, Construction, Manufacturing, Energy or Defense, Entertainment, Travel, Food & Beverage, Sports, Finance, Technology, Media & Communication, Professional Services, Education, Health Care, Non-profit, Government, Retail, Wholesale, Property Management, and Real Estate. Each of the selections is associated with a particular icon, examples of which are shown in FIG. 4. If no category selection has been received at step 604, the method 600 continues to step 616. As such, no image is associated with the icon. If at least one category selection has been received, an image corresponding with the selected category is designated at step 606. After the designation, the method 600 continues to step 608.

At step 608, a determination is made as to the number of category selections that have been received. In response to the number of category selections received, a shape is assigned to make up an outer portion of the icon at step 610. For example, in a case in which one category selection has been received, a circle is assigned as the outer portion of the icon. In a case where two or more categories have been selected, the number of sides of the outer portion shape is the number of categories plus one. Thus, according to an embodiment, a triangle is assigned to a two category selection, a square is assigned to a three category selection, a pentagon is assigned to a four category selection, and so on. In another embodiment, the shape assigned to the outer portion of the icon is the same, no matter the number of category selections received.

Next, visual indicators are associated with the category selections at step 614. The categories may be grouped into category groups, which are each associated with a color or other visual indicator. For example, Group 1 may include Agriculture, Transportation, Moving & Storage, Group 2 may include Construction, Manufacturing, Energy or Defense, Group 3 may include Entertainment, Travel, Food & Beverage, Sports, Group 4 may include Finance, Technology, Media & Communication, Professional Services, Group 5 may include Education, Health Care, Non-profit & Government, Group 6 may include Retail, Wholesale, and Group 7 may include Property Management, Real Estate. Group 1 may be associated with red, Group 2 may be associated with orange, Group 3 may be associated with yellow, Group 4 may be associated with green, Group 5 may be associated with blue, Group 6 may be associated with indigo, and Group 7 may be associated with violet.

A designated segment making up the outer portion shape of the icon is assigned the visual indicator associated with the selected category at step 614. In an embodiment in which the outer portion shape has multiple sides, each side is a segment. As such, one segment making up the outer portion of the icon is assigned one of the visual indicators associated with one or more selected category groups. If no category selection has been received, the designated segment making up the outer portion of the icon is assigned a black color visual indicator or other visual indicator cueing a member that no category is associated with the member's icon.

At some time before, simultaneously with or after step 604, a determination is made as to whether an attribute selection has been received at step 616. For example, an attribute may be affiliated with a geographic region that is divided into areas. For instance, the United States may be the geographic region and the areas may represent the attributes. In an embodiment, the attributes may include the western region, mountain region, plains region, central region, northeast region, mid-atlantic region, and southeast region. Visual indicators are associated with the attribute selections at step 618. In an embodiment, each attribute is associated with a color. In an example, the western region attribute is associated with red, the mountain region attribute is associated with orange, the plains region attribute is associated with yellow, the central region attribute is associated with green, the northeast region attribute is associated with blue, the mid-atlantic region attribute is associated with indigo, and the southeast region attribute is associated with violet. Alternatively, other geographic regions, such as regions based on finer or coarser granularity or those outside of the United States, may be employed. In another embodiment, each attribute is associated with a different visual indicator, such as line weight, line dashes, shading, patterns, and the like. A designated segment making up the outer portion of the icon is assigned the visual indicator associated with the selected attribute at step 620. If no attribute selection has been made, the designated segment making up the outer portion of the icon is assigned a black color visual indicator or other visual indicator cueing a member that no attribute is associated with the member's icon.

The icon is then generated and displayed at step 622. In an embodiment, the icon is generated based on the image corresponding to the category selection, the assigned outer portion shape, the visual indicators associated with the category selection, and the visual indicators associated with the attribute selection. In this regard, the image corresponding to the category selection is substantially centrally positioned in the icon, and the assigned outer portion shape surrounds the image. Depending on the number of attributes that were selected, segments making up the outer portion shape are displayed reflecting both types of visual indicators.

Figure 7A:
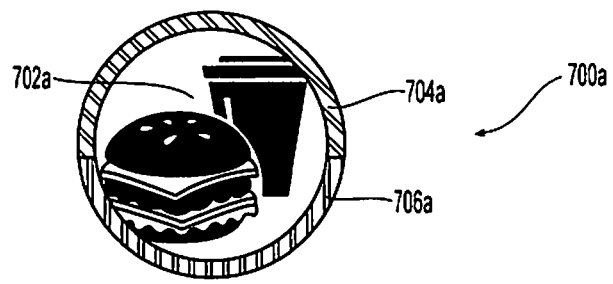
FIGS. 7A-7E are icons that may be generated by the method of FIG. 6, according to embodiments.
Figure 7B:
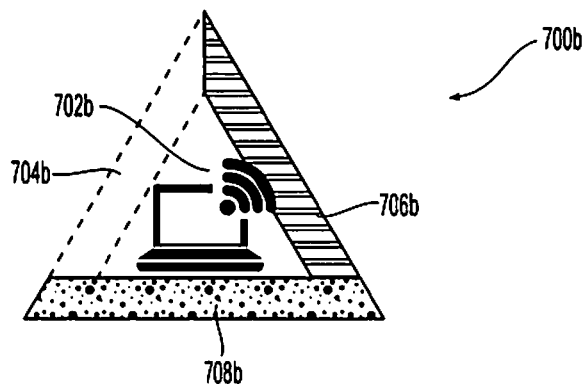
Figure 7C:
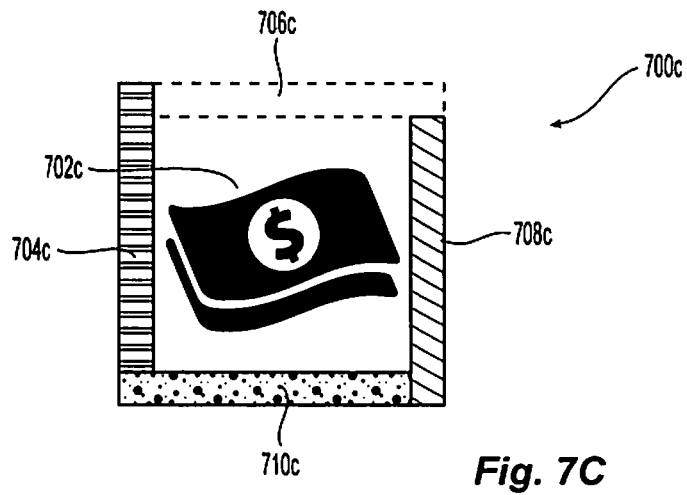

FIGS. 7A-7E are icons 700a-700e according to an embodiment. With additional reference to FIG. 4, the icon 700a in FIG. 7A includes an image 702a that indicates that the member associated with icon 700a is in the Food & Beverage Industry, a segment 704a that indicates that the member is in Group 3, and a segment 706a that indicates that the member is located in the northeast region. FIG. 7B illustrates an icon 700b including an image 702b that indicates that the member is in the Technology Industry, a segment 704b showing that the member is in Group 4, a segment 706b showing that the member is also in Group 5, and a segment 708b indicating that the member is located in western region. FIG. 7C illustrates in icon 700c with an image 702c indicating that the member is in Finance, a segment 704c showing that the member is in Group 5, a segment 706c showing that the member is also in Group 4,
a segment 708c showing that the member is also in Group 6, and a segment 710c indicating that the member is located in the western region.

Figure 7D:
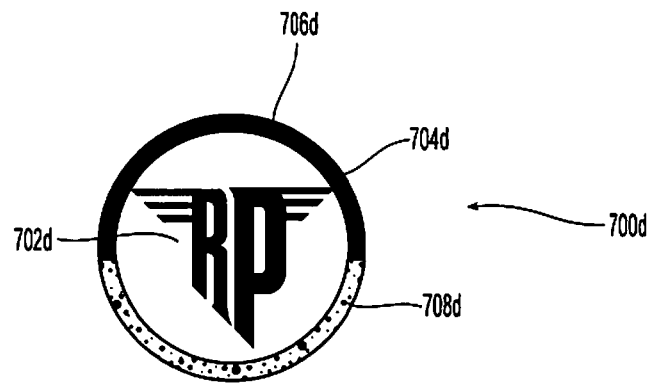

In an embodiment, in which no category selection was made, the icon may include a unique image. FIG. 7D includes an icon 700d in which an image 702d is a logo associated with the business. The image 702d may be surrounded by an outer portion shape 704d including a segment 706d indicating that no category selection was made and a segment 708d indicating that the member is located in the southeast region. In an embodiment in which no location selection was made, the outer portion shape 704d may have a visual indicator showing such.

Figure 7E:
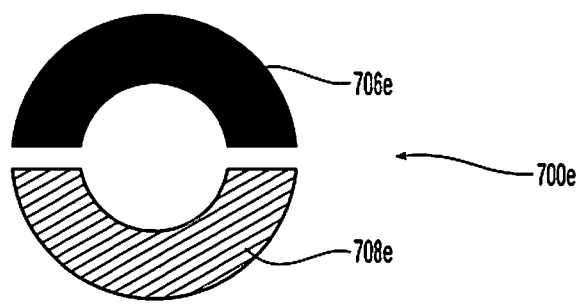

In another embodiment in which no category selection was made, the icon may not include a central image. FIG. 7E includes an icon 700e in which no central image is associated with the business. Rather, an outer portion shape including a segment 706e indicating that no category selection was made and a segment 708e indicating that the member is located in a southeast region. In an embodiment in which no location selection was made, the outer portion shape 704e may have a visual indicator showing such.

Although described as being implemented in the context of a business networking application, it is contemplated that generating and displaying icons as described above can be employed in other applications in which categories and attributes may be selected by various individuals and displayed as an icon that is immediately recognizable to others familiar with the categories and attributes. For example, the icons may be generated in job seeking applications (where the image is a picture of an applicant and the segments indicate different skills), marketing applications (where the image is a picture of a product category and the segments indicate different ratings or features), and the like.

It will be appreciated that an environment in which some embodiments of the disclosure are executed may incorporate a general-purpose computer or a special-purpose device such as a mobile device, tablet, hand-held computer, or other communication device. Although particular components that typically make up the devices (such as the processor, memory, data storage, display) are not described in detail herein, it will be appreciated that a component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Methods and processes described in the detailed description can be embodied as code and/or data, which can be stored in a non-transitory computer-readable storage medium. A non-transitory computer-readable storage medium may be implemented to store data structures and program code described in this detailed description. Non-transitory computer-readable storage medium may be any device or medium that can store code and/or data for use by a computer system, and include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed. When a processor or computer system reads and executes the code and manipulates the data stored on the medium, the processor or computer system performs the methods and processes embodied as code and data structures and stored within the medium.

The foregoing descriptions of embodiments of the disclosure have been presented for purposes of illustration and description only. They are not intended to be exhaustive or to limit the disclosure to the forms disclosed. Accordingly, many modifications and variations will be apparent to practitioners skilled in the art. The scope of the disclosure is defined by the appended claims, not the preceding disclosure.

What is claimed is:

1. A method of generating a visual image comprising:
at a central server:
receiving, by way of one or more client computers, an input including a plurality of data items for creating an account for a member on a website, the plurality of data items including one or more of a category selection and an attribute selection;
determining whether one or more category selections have been received;
designating an image corresponding to the category selection, if the one or more category selections have been received;
assigning an outer portion shape, based on a number of received category selections;
determining whether one or more attribute selections have been received;
associating a first type of visual indicator with each of the attribute selections;
designating one or more segments of the outer portion shape with the first type of visual indicators associated with each of the received attribute selections;
generating an icon, based on the designated image and the assigned outer portion shape, wherein the one or more segments of the outer portion shape are designated with the first type of visual indicators associated with each of the received attribute selections; and
causing the icon to be displayed via a display device.

2. The method of claim 1, wherein each of the first type of visual indicators is a different color.

3. The method of claim 1, further comprising:
at the central server:
associating a second type of visual indicator with each of the category selections; and
designating one or more segments of the outer portion shape with the second type of visual indicators associated with each of the received category selections,
wherein the generating the icon includes generating the assigned outer portion shape having the one or more segments designated with the second type of visual indicators associated with each of the received category selections.

4. The method of claim 3, wherein each of the first and the second type of visual indicators is a different color.

5. The method of claim 1, wherein the categories include industry categories and the attributes include location categories.

6. The method of claim 1, wherein when the number of category selections received is two or less, the outer portion shape is a circle.

7. The method of claim 6, wherein when the number of category selections is more than two, the outer portion shape has a number of sides that is equal to the number of category selections received plus one.

8. A method of generating a visual image comprising:
at a central server:
receiving, by way of one or more client computers, an input including a plurality of data items for creating an account for a member on a website, the plurality of data items including one or more of a category selection and an attribute selection;
determining whether one or more category selections have been received;
designating an image corresponding to the category selection, if the one or more category selections have been received;
assigning an outer portion shape, based on a number of category selections that have been received;
associating a first type of visual indicator with each of the category selections;
designating one or more segments of the outer portion shape with the first type of visual indicators associated with each of the category selections;
determining whether one or more attribute selections have been received;
associating a second type of visual indicator with each of the attribute selections;
designating one or more segments of the outer portion shape with the second type of visual indicators associated with each of the attribute selections;
generating an icon, based on the designated image and the assigned outer portion shape, wherein the one or more segments of the outer portion shape are designated with the first type of visual indicators associated with each of the category selections and the second type of visual indicators associated with each of the attribute selections; and
causing the icon to be displayed via a display device.

9. The method of claim 8, wherein each of the first and the second type of visual indicators is a different color.

10. The method of claim 8, wherein the categories include industry categories and the attributes include location categories.

11. The method of claim 8, wherein when the number of category selections received is two or less, the outer portion shape is a circle.

12. The method of claim 9, wherein when the number of category selections is more than two, the outer portion shape has a number of sides that is equal to the number of category selections received plus one.

13. A non-transitory computer-readable medium storing instructions that, when executed by a processor, cause the processor to:
receive, by way of one or more client computers, an input including a plurality of data items, the plurality of data items including one or more of a category selection and an attribute selection;
determine whether one or more category selections have been received;
designate an image corresponding to the category selection, if the one or more category selections have been received;
assign an outer portion shape, based on a number of received category selections;
determine whether one or more attribute selections have been received;
associate a first type of visual indicator with each of the received attribute selections;
designate one or more segments of the outer portion shape with the first type of visual indicators associated with each of the received attribute selections;

generate an icon, based on the designated image and the assigned outer portion shape, wherein the one or more segments of the outer portion shape are designated with the second type of visual indicators associated with each of the received attribute selections; and display the icon via a display device.

14. The non-transitory computer-readable medium of claim 13, wherein each of the first type of visual indicators is a different color.

15. The non-transitory computer-readable medium of claim 13, further comprising instructions, that when executed by the processor, cause the processor to:

associate a second type of visual indicator with each of the category selections; and designate one or more segments of the outer portion shape with the second type of visual indicators associated with each of the category selections, wherein the generating the icon includes generating the assigned outer portion shape having the one or more segments designated with the second type of visual indicators associated with each of the category selections.

16. The non-transitory computer-readable medium of claim 15, wherein each of the first type and the second type of visual indicators is a different color.

17. A system for generating a visual image, the system comprising:

one or more client computers; and a central server configured to communicate with the one or more client computers, the central server including:
a processor, and
a memory storing instructions that, when executed by the processor, cause the processor to:
receive, by way of at least one of the client computers, an input including a plurality of data items, the plurality of data items including one or more of a category selection and an attribute selection;
determine whether one or more category selections have been received;
designate an image corresponding to the category selection, if the one or more category selections have been received;
assign an outer portion shape, based on a number of received category selections;
determine whether one or more attribute selections have been received;
associate a first type of visual indicator with each of the received attribute selections;
designate one or more segments of the outer portion shape with the first type of visual indicators associated with each of the received attribute selections;
generate an icon, based on the designated image and the assigned outer portion shape, wherein the one or more segments of the outer portion shape are designated with the first type of visual indicators associated with each of the received attribute selections; and
transmit instructions to display the icon via a display device.

18. The system of claim 17, wherein each of the first type of visual indicators is a different color.

19. The system of claim 17, wherein the memory further comprises instructions, that when executed by the processor, cause the processor to:

associate a second type of visual indicator with each of the category selections; and designate one or more segments of the outer portion shape with the second type of visual indicators associated with each of the received category selections, wherein the generating the icon includes generating the assigned outer portion shape having the one or more segments designated with the second type of visual indicators associated with each of the received category selections.

20. The system of claim 19, wherein each of the first type and the second type of visual indicators is a different color.

* * * * *